ns Patent [19]

Borchard et al.

[11] 4,322,841
[45] Mar. 30, 1982

[54] PLAYBACK INSTRUMENT FOR AN INFORMATION CARRIER DISC

[75] Inventors: Heinz Borchard, Nortorf; Horst Redlich, Berlin, both of Fed. Rep. of Germany

[73] Assignee: Licentia Patent-Verwaltungs G.m.b.H, Frankfurt am Main, Fed. Rep. of Germany

[21] Appl. No.: 39,572

[22] Filed: May 16, 1979

[30] Foreign Application Priority Data

May 16, 1978 [DE] Fed. Rep. of Germany ....... 2821296

[51] Int. Cl.³ ............................................... G11B 3/60
[52] U.S. Cl. .................................. 369/270; 369/271; 369/280; 369/282
[58] Field of Search ................ 274/39 R, 39 A, 42 R, 274/9 B; 360/97, 86; 179/100.16; 358/128.5, 128.6; 346/137; 369/270, 271, 280, 282

[56] References Cited

U.S. PATENT DOCUMENTS

| 663,194 | 12/1900 | Myers | 274/39 R |
|---|---|---|---|
| 1,637,544 | 8/1927 | Bishop | 274/42 R |
| 2,806,704 | 9/1957 | Burdett | 274/42 R |
| 2,943,861 | 7/1960 | Redfield | 274/39 |
| 3,430,966 | 3/1969 | Gregg | 274/42 R |
| 3,670,315 | 6/1972 | Fowler | 360/97 |
| 3,682,487 | 8/1972 | Eriksson | 274/42 R |
| 3,706,085 | 12/1972 | Mowrey et al. | 274/39 R |
| 3,912,283 | 10/1975 | Hammond et al. | 274/39 A |
| 4,065,135 | 12/1977 | Doughty | 274/39 R |
| 4,068,851 | 1/1978 | Yamamura | 274/39 A |
| 4,153,257 | 5/1979 | Wittenberg et al. | 274/39 A |

FOREIGN PATENT DOCUMENTS

| 355621 | 8/1931 | United Kingdom | 274/39 R |
|---|---|---|---|
| 580574 | 11/1977 | U.S.S.R. | 274/39 R |

*Primary Examiner*—John W. Shepperd
*Attorney, Agent, or Firm*—Spencer & Kaye

[57] ABSTRACT

A playback instrument for a record disc, the instrument including a turntable for supporting the disc to be played on which the disc is centered by means of a central bore, is provided with two annular, concentrically disposed, radially spaced flat bearing surfaces mounted on the turntable for the disc, the surfaces forming a rigid support, one bearing surface being disposed in the vicinity of the location of the center of such disc and the other bearing surface being disposed radially to the outside of the one surface at a distance from the location of the center of such disc, and disc holding components provided for exerting on such disc an attracting force of such magnitude as to cause the disc to contact the bearing surfaces over the entire area thereof.

11 Claims, 8 Drawing Figures

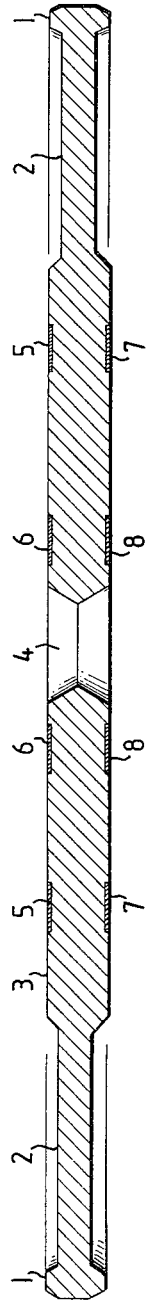
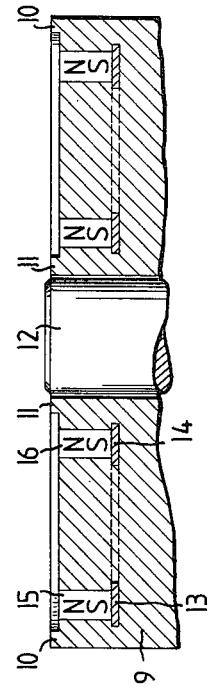
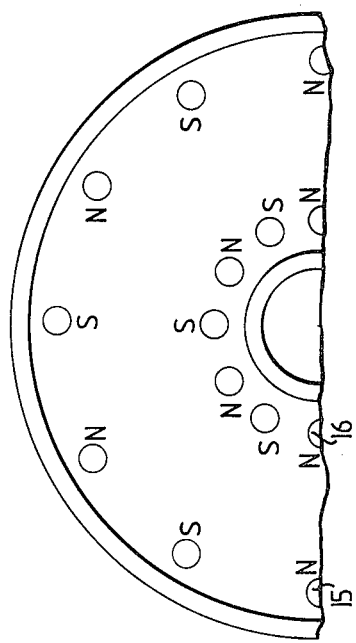
FIG. 1
FIG. 2
FIG. 3
FIG. 4

PLAYBACK INSTRUMENT FOR AN INFORMATION CARRIER DISC

BACKGROUND OF THE INVENTION

The present invention relates to playback instruments for record discs, particularly discs carrying high density recordings, and to discs for use with such instruments.

Information carrier discs, or record copies, carry information to be played back in the form of a spiral, modulated groove formed in a surface which is flat, at least when the record is new. Rigid record copy discs have a tendency to deviate from this ideal planar shape, for example, if they become warped due to stresses during storage. The prior art long-playing phonograph records which have a diameter of 30 cm, exhibit at their outer edges deviations from a flat plane of up to ±2 mm. Due to the relatively low rate at which such a record disc rotates during playback, this deviation has no noticeable adverse effect.

However, the playback of rigid discs recorded according to the dense storage technique, i.e. having a large number of groove turns per mm. and carrying high frequency information, requires a relatively high rate of rotation. Due to this high rate of rotation and the extremely small transverse dimensions of the groove being scanned only very slight deviations of the plane being scanned from a flat surface is permissible. For example, there exists the requirement that with a playback speed of 500 rpm and a disc diameter of 210 mm, a maximum deviation of 0.15 mm from a flat plane must not be exceeded. In order to meet such requirements, the disc must be aligned on the playback instrument to have a planar form. Centering of the disc must also be effected within very close tolerances. For example, the maximum acceptable eccentricity of the groove spiral relative to its center of rotation may be 0.02 mm.

SUMMARY OF THE INVENTION

It is an object of the present invention to provide a playback instrument which establishes planarity of the surface to be scanned and fixing of the disc in its planar configuration with very simple but effective means.

These and other objects are achieved according to the present invention, in a playback instrument for a record disc, the instrument including a turntable for supporting the disc to be played on which the disc is centered by means of a central bore, by the provision of two annular, concentrically disposed, radially spaced flat bearing surfaces mounted on the turntable for the disc, the surfaces forming a rigid support, one bearing surface being disposed in the vicinity of the location of the center of such disc and the other bearing surface being disposed radially to the outside of the one surface at a distance from the location of the center of such disc, and disc holding means provided for exerting on such disc an attracting force of such magnitude as to cause the disc to contact the bearing surfaces over the entire area thereof.

In the playback instrument according to the invention the disc to be played is pressed against two annular, concentrically arranged bearing bars. The faces of the bearing bars in contact with the disc lie in one plane, for example, if the areas contacted on the disc lie at a common level. Thus the disc is fixed in a plane in the area of the bearing bars. It has been found that this causes the entire record to be pulled into a planar orientation.

The bearing bars may each form a continuous circular and annular contact area. Alternatively, they may be subdivided into smaller bearing faces, all at the same height. The force pressing the disc against the bearing bars may be provided, for example, by a plunger.

According to an advantageous embodiment of the invention, the disc is fixed in the manner indicated above only in a center region which bears no recorded information. It has been found that this also puts the scanning region of the disc into a planar orientation.

According to a particularly favorable embodiment, magnets are provided in the turntable of the playback instrument in the vicinity of the bearing bars. These magnets act on magnetically active parts fixed to the disc. The force exerted on these magnetically active parts by the magnets can easily be made large enough to cause the disc to be firmly supported at every point along the circumference of the bearing bars and thus to be oriented parallel to the plane of the bearing bars. Alternatively, a member of a suitable magnetic material which is not connected with the disc and which is disposed on the side of the disc opposite the magnets may be pulled magnetically against the disc.

BRIEF DESCRIPTION OF THE DRAWINGS

FIG. 1 is a cross-sectional view of an information carrier or record copy, disc which is to be played on a playback instrument, the thickness of the disc being exaggerated to facilitate illustration of certain components.

FIG. 2 is a view similar to that of FIG. 1 and showing the disc of FIG. 1 without the thickness dimension exaggerated.

FIG. 3 is a cross-sectional view of a preferred embodiment of a turntable of a playback instrument according to the invention.

FIG. 4 is a plan view of a portion of the turntable of FIG. 3.

DESCRIPTION OF THE PREFERRED EMBODIMENTS

Figure 5:
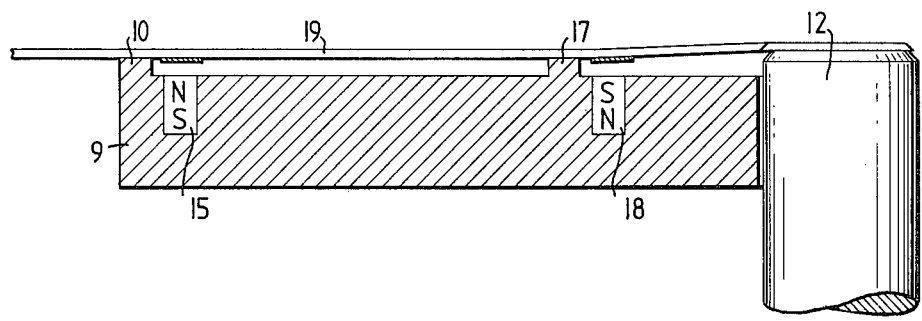
FIG. 5 is a cross-sectional detail view of another embodiment of a turntable provided with special means for centering a disc.

FIG. 1 is a sectional view of an information carrier, or record copy disc having a centering bore 4, defined by a frustoconical portion at each side of the disc. Information is recorded on one or both sides of the disc, in the region 2, in the form of a spiral-shaped groove. The region 2 is arranged at a lower height than an edge region 1 and a center region 3 so that the groove cannot be damaged when the disc is placed against a surface. The disc may be disposed, for example, in a cassette in which the disc can freely rotate without touching the cassette housing when the cassette is inserted into a playback instrument. The centering bore 4 has two centering portions whose sides are conically tapered to converge in the direction toward an interior plane of the disc. The illustrated disc can be played on both sides. Each of the upper and lower regions of the conical centering opening serves to center the disc with respect to the record groove disposed on its respective side. The disc is played from the side on which the record groove is centered. That means that the disc will be played at the bottom side when it is centered at the bottom side.

In FIG. 1, the disc is shown greatly enlarged in the direction of its thickness in order to better illustrate its details. FIG. 2 shows the same disc approximately true to scale.

FIG. 3 is a cross-sectional view of the turntable of a playback instrument. Further details of the playback instrument are not shown and are conventional in the art. The turntable includes an axially symmetrical plate 9 and a conical centering pin 12 which cannot be displaced with respect to the plate 9. The plate 9 is provided with annular, concentrically arranged bearing bars 10 and 11. The upper delimiting faces of the bearing bars 10 and 11 which serve as contact surfaces for the disc lie in a common plane. The inner, concentric bearing bar 11 borders directly at the centering pin 12. The bearing bar 10 lies at the outer edge of the turntable and contacts the disc at the outer portion of the center region 3 that contains no recording.

The weight of the disc itself is not sufficient to assure that the disc contacts the bearing bars over their entire area. For that reason, means are provided to exert an additional force on the disc. In the illustrated case, this force is generated by permanent magnets 15 and 16 embedded in plate 9. The magnets are disposed as close as possible to the bearing bars 10 and 11. Opposite the magnets, strips 5, 6, 7 and 8 in the form of circular rings of a, preferably soft, magnetic material are fastened to the disc, in center region 3, as shown in FIGS. 1 and 2.

As can be seen in FIG. 4, the permanent magnets 15, 16 are evenly distributed around the entire circumference of the bearing bars. In this way, the disc is pressed uniformly against the bearing bars 10 and 11 over its entire circumference.

Members 13 and 14 in the form of circular rings are disposed underneath the magnets 15 and 16 to form a magnetic circuit. The magnets are recessed with respect to the contact faces of the bearing bars 10 and 11. The air gap resulting therefrom between the upper surfaces of magnets 15 and 16 and the common surface provided by bars 10 and 11 determines the force with which the disc is attracted. This measure further assures that the disc will positively rest on the bearing bars and not on the magnets.

FIG. 5 shows an additional feature which permits utilization of the forces acting on the disc to center the disc on the conical centering pin 12. The parts corresponding to the illustration in FIG. 3 are provided with the same reference numerals. However, in FIG. 5, an inner bearing bar 17 is spaced from the centering pin 12. A vertically directed force is required between the disc 19 and the centering pin 12 in order to center the disc 19 by means of the conical centering pin 12. This force could be provided, for example by designing, or mounting the centering pin 12 to be elastically yielding in the downward direction.

In the illustrated embodiment, this force is generated in a particularly simple manner.

The centering pin 12 is disposed higher than the contact surfaces of the bearing bars 10 and 17 by an amount such that the disc is pressed onto the centering pin 12 only by the magnetic forces acting on the disc. The elasticity of the disc is thus utilized. The disc is deflected downwardly until it rests on the bearing bar 17, at which time it is curved or inclined upwardly from bar 17 to pin 12. Since the centering opening in disc 19 is pressed against pin 12, the downward force acts to center disc 19 on pin 12.

Instead of the individual permanent magnets 15 and 16 illustrated in FIGS. 3 and 4, it is also possible to use a continuous magnetic strip similar to that used to close refrigerator doors. Furthermore, as shown in FIG. 6, the soft magnetic members provided at the disc may be designed in the form of washers 20 which extend over the entire area of the magnets in region 3.

When the disc is to be played on both sides, soft magnetic members may be provided in region 3 on both sides of the disc, as shown in FIGS. 1, 2, 6 and 8. Or, as shown in FIG. 7, soft magnetic rings 21 and 22, or a broad washer may be imbedded into the material during manufacture of the disc so that the rings 21 and 22 or the washer lie inside the disc, substantially along its median plane.

Figure 8:
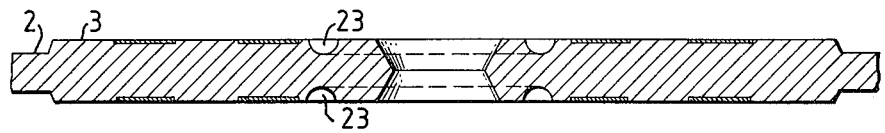

FIG. 8 shows a disc particularly well suited for a turntable operating according to the principle indicated in FIG. 5. In the area to the inside of the inner bearing bar, the disc is provided on each side with an annular groove 23. The force with which the disc is pressed onto the centering pin 12 is then determined by the depth and the shape of these grooves. The spring characteristic of the disc when being pulled against the bearing bars is used to compensate manufacturing tolerances of the disc and the turntable.

Figure 6:
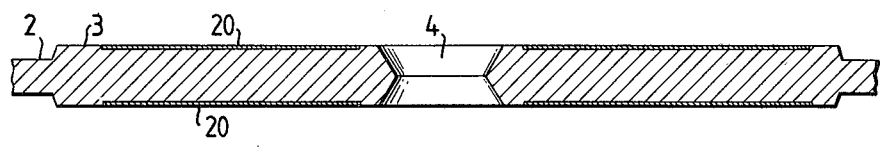
FIGS. 6 through 8 are views similar to that of FIG. 1 showing various embodiments of record copy discs that can be played on the playback instrument of FIG. 3.
Figure 7:
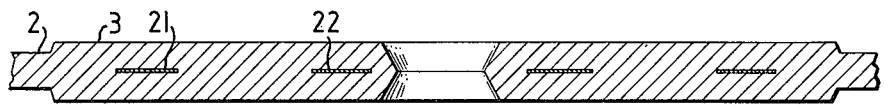

In FIGS. 6 and 8 the thickness of the disc is enlarged in a manner corresponding to the illustration of FIG. 1.

It will be understood that the above description of the present invention is susceptible to various modifications, changes and adaptations, and the same are intended to be comprehended within the meaning and range of equivalents of the appended claims.

What is claimed is:

1. In a playback instrument for a record disc provided with a center region and with recorded information located exclusively in a second region enclosing the center region, the instrument including a turntable for supporting the disc to be played, on which the disc is centered by means of a central bore, the improvement comprising means defining two annular, concentrically disposed, radially spaced flat bearing surfaces mounted on said turntable for the disc with the portion of said turntable between said surfaces being recessed below said surfaces, said surfaces forming a rigid support, one said bearing surface being disposed in the vicinity of the location of the center of such disc and the other said bearing surface being disposed radially to the outside of said one surface at a distance from the location of the center of such disc to contact the radial outer portion of the center region of the disc, and disc holding means provided for exerting on such disc a magnetic attracting force of such magnitude as to cause the disc to contact said bearing surfaces over the entire area thereof, and wherein said turntable comprises a disc centering pin having a conical surface dimensioned for engaging the central bore of the disc and said one bearing surface is spaced radially from said pin, said conical surface protruding beyond said bearing surfaces to such an extent as to cause a record disc placed on said turntable to be slightly curved, when the disc is in contact with said bearing surfaces, in the region of the disc which is radially enclosed by said one bearing surface to produce a spring force in the disc which acts to center the disc on said centering pin.

2. Playback instrument as defined in claim 1 wherein said two annular bearing surfaces are coplanar.

3. A record disc for playback on the instrument as defined in claim 1, said disc being provided with a region of reduced thickness at a location radially inward of the one bearing surface to control the magnitude of the force produced during curving of said disc.

4. Playback instrument as defined in claim 1 wherein said disc holding means comprise magnets disposed in said turntable in the vicinity of said bearing surfaces, said magnets being arranged to exert an attracting force on magnetic members carried by the disc.

5. A record disc for playback on the instrument defined in claim 4, said disc comprising magnetic means located to cooperate with the magnets disposed in the turntable.

6. A disc as defined in claim 5 wherein said magnetic members are of soft magnetic material.

7. A disc as defined in claim 5 or 6 wherein said magnetic means are constituted by two concentric rings at locations coinciding with the locations of the magnets disposed in the turntable.

8. A disc as defined in claim 7 provided with recorded information on both sides and wherein said disc is provided with two said concentric rings on each of its sides.

9. A disc as defined in claim 5 or 6 wherein said magnetic means are constituted by a circular washer at a location coinciding with the locations of the magnets disposed in the turntable.

10. A disc as defined in claim 9 provided with recorded information on both sides and wherein said disc is provided with one said circular washer on each of its sides.

11. A disc as defined in claim 5 or 6 wherein said magnetic means are constituted by a member of magnetic material disposed within said disc substantially at the median plane thereof.

* * * * *